(12) United States Patent
Yanagihara (10) Patent No.: US 8,065,143 B2
(45) Date of Patent: Nov. 22, 2011

(54) PROVIDING TEXT INPUT USING SPEECH DATA AND NON-SPEECH DATA

(75) Inventor: Kazuhisa Yanagihara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 795 days.

(21) Appl. No.: 12/035,962

(22) Filed: Feb. 22, 2008

(65) Prior Publication Data

US 2009/0216531 A1    Aug. 27, 2009

(51) Int. Cl.
*G10L 15/00*    (2006.01)
*G10L 21/00*    (2006.01)
(52) U.S. Cl. ......... 704/235; 704/231; 704/270; 455/563
(58) Field of Classification Search ................. 704/235, 704/257, 270.1
See application file for complete search history.

(56) References Cited

U.S. PATENT DOCUMENTS

| | | | |
|---|---|---|---|
| 6,401,065 B1* | 6/2002 | Kanevsky et al. | 704/256.4 |
| 6,532,446 B1* | 3/2003 | King | 704/270.1 |
| 7,260,529 B1* | 8/2007 | Lengen | 704/235 |
| 7,319,957 B2* | 1/2008 | Robinson et al. | 704/252 |
| 2003/0157968 A1* | 8/2003 | Boman et al. | 455/563 |
| 2009/0164655 A1* | 6/2009 | Pettersson et al. | 709/231 |

* cited by examiner

*Primary Examiner* — Vincent P Harper
(74) *Attorney, Agent, or Firm* — Fish & Richardson P.C.

(57) ABSTRACT

Systems, methods, and computer readable media providing a speech input interface. The interface can receive speech input and non-speech input from a user through a user interface. The speech input can be converted to text data and the text data can be combined with the non-speech input for presentation to a user.

24 Claims, 7 Drawing Sheets

PROVIDING TEXT INPUT USING SPEECH DATA AND NON-SPEECH DATA

TECHNICAL FIELD

The subject matter of this patent application is generally related to deriving text data from speech data.

BACKGROUND

Keyboards or keypads are often used to input text into computing devices. However, some software solutions enable the user to enter text data using speech. These software solutions convert the speech to text using speech recognition engines. However, these software solutions can be difficult to use when entering symbolic characters, style or typeface input because they typically require escape sequences to exit a speech input mode and then additional input to return to speech input mode.

SUMMARY

The disclosed implementations are directed to systems, methods, and computer readable media for providing a text editor that can receive speech and non-speech input. Example systems can include an interface, a speech recognition module, and a text composition module. The interface can receive speech data and non-speech data from a mobile device, the speech data and non-speech data including sequence information. The speech recognition module can analyze the speech data to derive text data, the text data comprising sequence information associated with each of a plurality of words associated with the speech data. The text composition module can receive the text data and combine the text data with the non-speech data based upon the sequence information. The text composition module can thereby produce combined text data derived from the text data and the non-speech data. The interface can transmit the combined text data to the mobile device for presentation to a user of the mobile device.

Example methods for providing a text editor can include: receiving speech input and non-speech input from a user, the speech input and non-speech input comprising respective sequence indicators; providing the speech input and non-speech input to a speech to text composition module; receiving text data from the speech to text composition module, the text data comprising a textual representation of the provided speech input combined with the provided non-speech input; and presenting the text data to the user.

Example text editors can include a non-speech text editing environment and a speech editing environment. The non-speech editing environment can be displayed during a non-speech editing mode, and can receive keyboard data from a user and can present text data related to the keyboard input to the user. The non-speech editing environment also includes a first escape sequence to enter a speech input mode. The speech editing environment can be displayed during the speech input mode. The speech editing environment can receive speech input and non-speech input from the user, and can present text data derived from the speech input and non-speech input to the user. The speech editing environment can include a second escape sequence used to resume the non-speech editing mode.

Other implementations are disclosed, including implementations directed to systems, methods, apparatuses, computer-readable mediums and user interfaces.

DETAILED DESCRIPTION

Figure 1A:
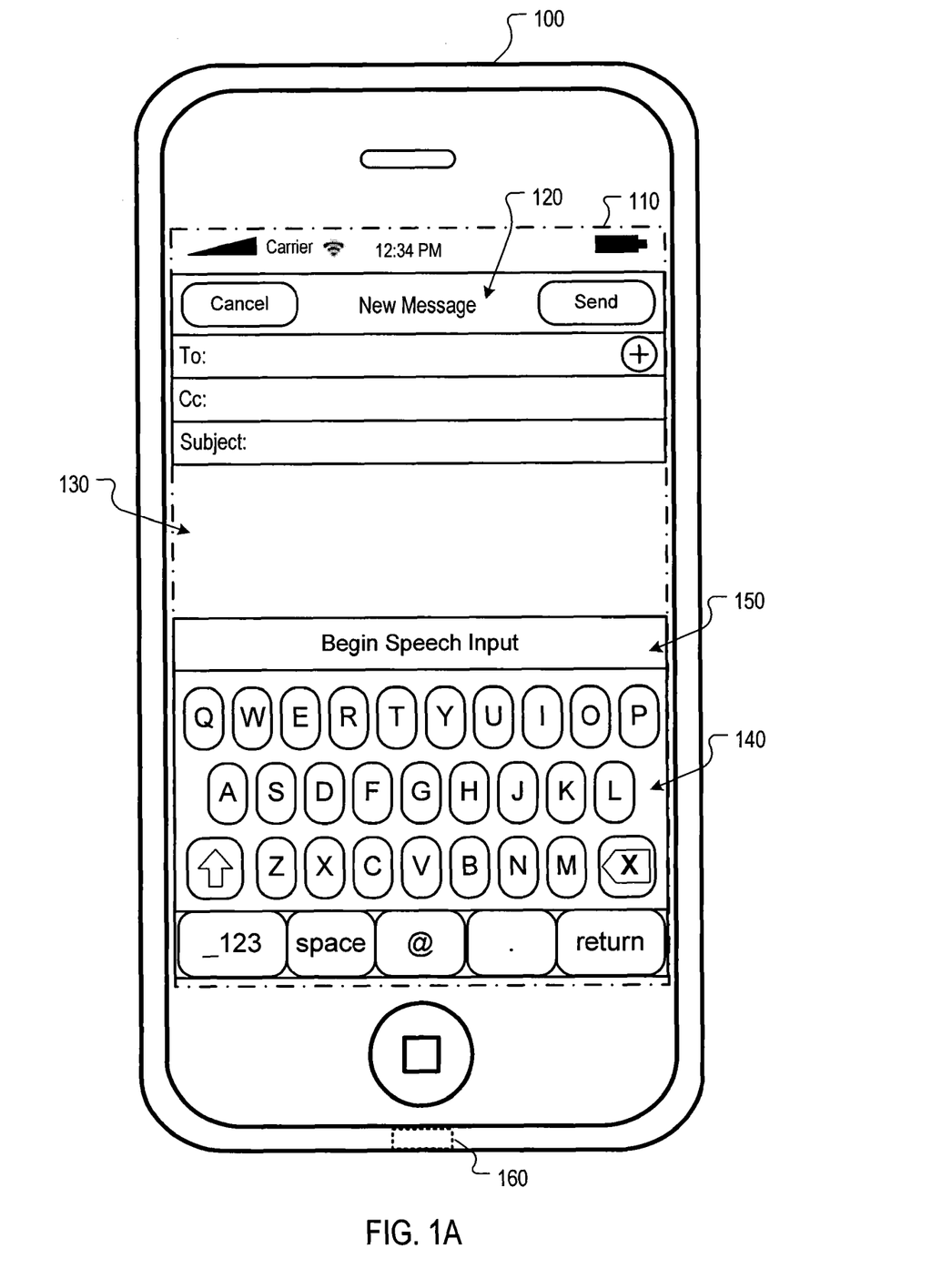
FIGS. 1A-1B are schematic diagrams illustrating example user interfaces of an audio text editor of a mobile device.

FIG. 1A shows an example mobile device 100 (e.g., a mobile phone, a portable MP3 player, a personal digital assistant (PDA), etc.) that includes a user interface of an editing interface 110. For example, the user can use the editing interface 110 to compose a text message, such as a text message for an electronic mail (email) application, a short message service (SMS) application, a word processing application, a data entry application, and/or an instant message (IM) application, among many others.

As shown, the editing interface 110 includes an input window 130 and a virtual keyboard 140. For example, the input window 130 and the virtual keyboard 140 are displayed using a touchscreen display. In some implementations, the virtual keyboard 140 graphically displays a rendition of a traditional keyboard having characters. In some examples, characters can be provided in a US-English keyboard layout format. Other layout formats can also be provided. A user of the mobile device 100 can enter text using the virtual keyboard 140 by tapping one or more character representations displayed. Additionally, the user can adjust a current position of the cursor by tapping on a desired position in the input window. For example, the user can move the cursor to control a location where the next input character is to be displayed. In some examples, the user can select a range of text using the input window 130. After selecting the text from the input window 130, the user can add format and style to the selected text.

The editing interface 110 can support speech input from the user. For example, the mobile device 100 can receive speech through a microphone 160. In some implementations, the editing interface 110 can display text derived from the received speech using the input window 130. In the depicted example, the user can select a "begin speech input" selection 150 to enable the mobile device 100 to receive speech input. After the begin speech input selection 150 is selected, the mobile device 100 can receive speech data from the microphone 160. In some implementations, the speech input can be processed in real-time. In other implementations, the speech input can be recorded for subsequent processing.

Figure 1B:
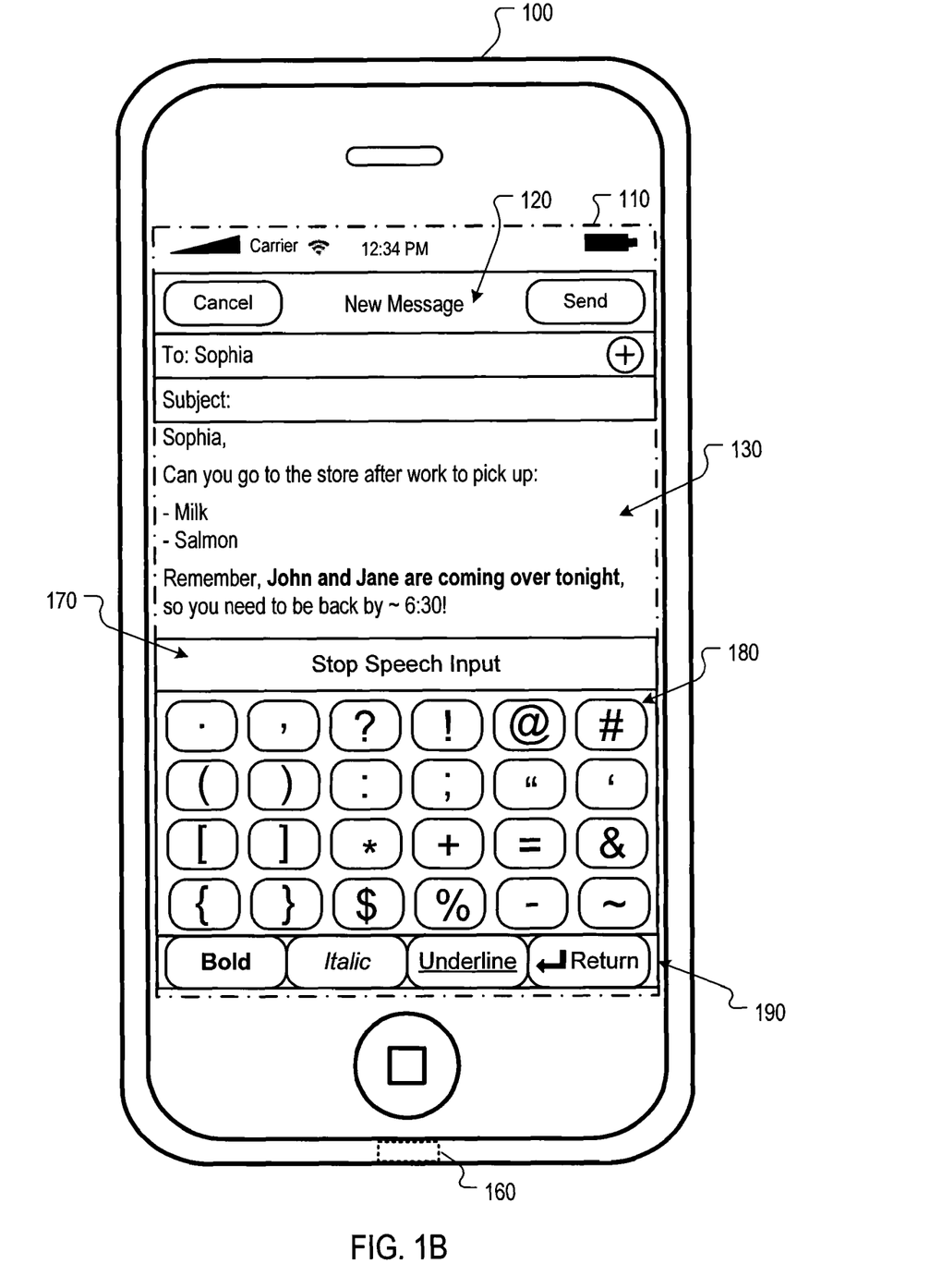

FIG. 1B shows an example of the editing interface 110 after a user enables speech input using the "begin speech input" selection 150 of FIG. 1A. At this time, the user can speak into the microphone 160 thereby generating text to be included in the message. As shown, the editing interface 110 can include a "stop speech input" selection 170. For example, the user can select the selection 170 to disable the mobile device 100 from receiving voice input from the user.

In some implementations, the editing interface 110 can include a modified virtual keyboard 180 for entering non-speech input. For example, non-speech input can include any non-alphanumeric characters or typeface selections. The non-alphanumeric characters can include, for example, among others, symbolic characters, and/or punctuation characters that can supplement the speech input. The typeface selections can include, for example, font-type, font size, font or background color, carriage return, spacing, margins, alignment, bold typeface, italic typeface, and underline typeface, among many others In the example shown in FIG. 1B, the keyboard 180 includes punctuation symbols, parenthesis, the "at" symbol, a "dash" symbol, and other commonly used non-speech input.

In some implementations, non-speech selections for a modified virtual keyboard 180 can include style selections 190. The style selections 190 can include typeface input, such as a bold input representation, an italic input representation, an underline input representation, and carriage return character representation, among others. In one implementation, after receiving a selection of the style selections 190, the input window 130 may display the subsequently received speech input (converted to text data) in the selected style (e.g., with bold, italic, and/or underline effects). After receiving a second selection of the selected style, the input window can stop displaying subsequently received speech input in the selected style. In additional examples, the style selections 190 can also include other formatting options, such as those operable to change font sizes or colors, associated with the entered text. In other examples, the modified virtual keyboard 180 can include modified key representations, such as shift and caps lock.

In some implementations, more than one page of non-speech selections is available. For example, other non-speech selections can be displayed on a second page of the virtual keyboard 180. In some implementations, the user can trigger the editing interface 110 to display another page of non-speech selections using a specific user gesture or button representation. For example, the editing interface 110 can display another page of non-alphanumeric characters and/or style selections after detecting a user swipe (e.g., a user dragging his/her finger across the interface) through the virtual keyboard 180 (e.g., from left to right).

During a speech input session, the user can tap one or more non-speech selections (e.g., symbolic characters and/or style/typeface effects) on the virtual keyboard 180 to provide additional input to the mobile device 100. In some implementations, the speech data and non-speech data can be tagged with sequence information. Sequence information can include information used to identify the sequence in which the speech data and non-speech data should be assembled. In some examples, the mobile device 100 sequence information can include a time-stamp when the non-speech selection(s) are input. The time-stamp, for example, can be based on elapsed time of the speech input session, universal time, local time, a relative time, etc. For example, the mobile device 100 can insert the non-speech selection(s) based on the assigned time stamps. Some examples of the time stamped speech data and non-speech selection information are described with reference to FIGS. 5-6.

In other implementations, the sequence data can include a sequential order in which the inputs were received. For example, if the user speaks for five seconds, selects three non-speech selections, and speaks for another three seconds before entering a final non-speech selection, the initial speech can be tagged as first, the first three non-speech selections can be tagged as two, three and four, the three seconds of speech input can be tagged as five, and the final non-speech selection can be tagged as six. Thus, when the speech data is being combined with the non-speech data, the order in which the speech data and non-speech data were received is indicated by the sequence data. Other sequence indications can be used.

In some implementations, the non-speech selection(s) can be inserted into the text based on the determined sequence. For example, if the user selects a period character (".") after the user has finished one sentence but before the user starts speaking the next sentence, then a text composition engine can determine that the period character is to be placed between the two sentences. In some implementations, the sequence information can include time stamps. In such implementations, the mobile device 100 can assign a time stamp associated with each non-speech selection.

As shown in FIG. 1B, the input window 130 includes an example message to Sophia. As an illustrative example, to input the depicted message, the user began by speaking "Sophia" followed by a selection of the comma character representation (",") and two sequential carriage return character representations. Next, the user spoke "can you go to the store after work to pick up" and then selected the colon character representation (":"), two sequential carriage return character selections, a dash character representation ("-") and a space character representation. After inputting the space character representation, the user in this example continued by speaking "milk" followed by one carriage return character representation. After inputting another dash character followed by a space character, the user spoke "salmon" and selected two sequential carriage return character representations. Next, the user spoke "remember" and then selected a comma and a space character representation. Next, the user enabled the bold style using the style selections 190. Because the bold style is selected, the sentence spoken by the user "John and Jane are coming over tonight" is displayed in bold. The user then deselected the bold style by selecting the bold selection representation. The user then selected a comma and a space character representation and spoke "so you need to be back by." The user then selected a tilde character representation, a six character representation, a colon character representation, a three character representation, a zero character representation and an exclamation point character representation using the virtual keyboard. The user can then select a "stop speech input" selection representation 170, which can return the user to a non-speech text editing interface (e.g., interface 110 of FIG. 1A). In some implementations, the user can edit the text displayed in the input window 130 using the virtual keyboard 140.

Thus in the example above the user entered speech and non-speech input during the speech input session. The speech and non-speech input were then processed and combined to provide input to a currently selected application (e.g., electronic mail). The input did not require that the user speak or input any special phrases or keystrokes to access non-speech characters, or any subsequent editing to insert the non-speech characters into the text data derived from the speech data.

In some implementations, speech recognition operations for generating a text representation of the received speech data can be performed locally (e.g., local to the mobile device) or remotely (e.g., through a network connection). In other implementations, the mobile device 100 can include a speech recognition engine operable to convert the received speech input into text and a text composition engine operable to insert the non-speech characters into the text. In another example, the mobile device 100 can transmit the speech input and the non-speech input (e.g., style selections, and symbolic or numeric character selections, among others) to a remote server over a network (e.g., the internet). The mobile device 100 can receive from the remote server, a textual representation of the speech input combined (e.g., interleaved) with the associated non-speech input. The mobile device 100 can reduce power consumption and/or conserve computation power by using a remote server to convert speech data into text data.

Figure 2:
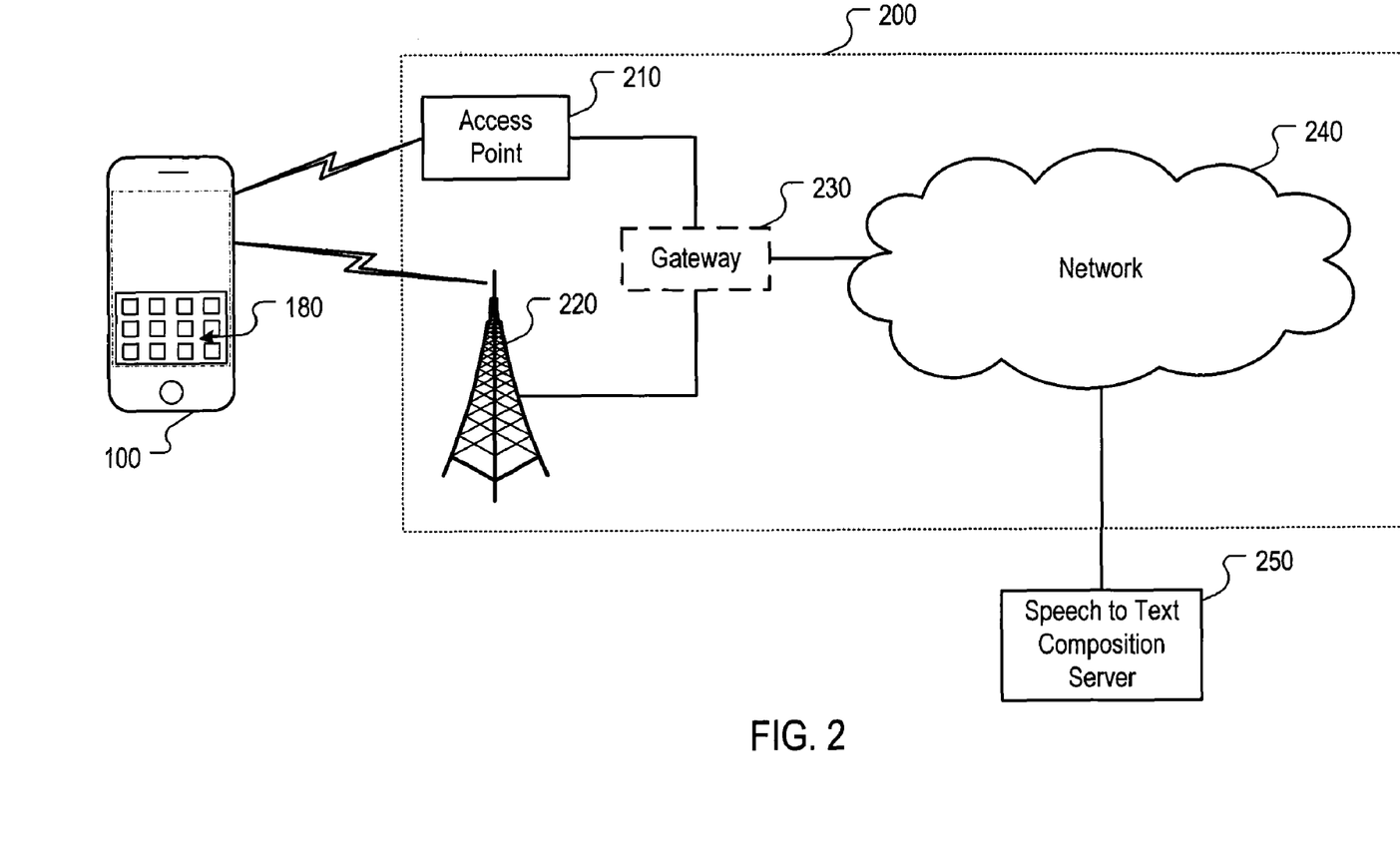
FIG. 2 is a block diagram illustrating an example network environment in which the audio text editor can be used.

FIG. 2 is a block diagram of an example network environment 200 coupled to the mobile device 100 and a speech to text composition server 250. The network environment 200 includes an access point 210, a base station 220, an optional network gateway 230, and a network 240 (e.g., a wide area network (WAN), a local area network (LAN), or the Internet).

As shown in FIG. 2, the network environment 200 is capable of communicating wirelessly with the mobile device 100. In some implementations, the mobile device 100 can transmit data to the network 240 via the access point 210, such as, for example, an Institute of Electrical and Electronics Engineers (IEEE) 802.11g wireless access point, and the network gateway 230. Voice and/or data communications can be established between the mobile device 100 and the access point 210. The mobile device 100 can place and receive phone calls (e.g., using VoIP protocols), send and receive e-mail messages (e.g., using POP3 protocol), and retrieve electronic documents and/or streams, such as web pages, photographs, and videos, over the network 240 via the access point 210 and the gateway 230. The mobile device 100 can communicate with the speech to text composition server 250 via the access point 210 to convert a speech input and non-speech input into text for display on the mobile device 100.

The mobile device 100 can also transmit and receive data using the base station 220 instead of the access point 210. For example, the base station 220 can be configured to communicate data based on one or more types of cellular networks (e.g., a Code Division Multiple Access (CDMA) network, a Time Division-Synchronous Code Division Multiple Access (TD-SCDMA) network, etc.). In one example, the base station 220 can convert data received from the cellular network into a format usable by the gateway 230 and can transmit the data to the network 240 through the gateway 230. The mobile device 100 can communicate with the base station 220 to receive phone calls, send and receive e-mail messages, and/or retrieve electronic documents or data stream over the network 240.

In some implementations, the mobile device 100 and the speech to text composition server 250 use a real time media protocol (e.g., a Real-time Transport Protocol (RTP) or a Real Time Streaming Protocol (RTSP)) for communication. In one example operation, after receiving speech data from the microphone 160 and non-speech data from the virtual keyboard 180, the mobile device 100 can transmit a multiplexed data stream, including the speech data and the associated non-speech data, to the speech to text composition server 250 via the network environment 200. Based on the real time media protocol and included sequence information, the speech to text composition server 250 can interpret and generate a textual representation of the received data. An example system for generating the textual representation is described with reference to FIG. 4.

In other implementations, the processing of the speech and/or non-speech data can be distributed. For example, the server 250 can perform speech to text conversion, while the mobile device 100 combines the converted text with the non-speech data.

In some implementations, the connection between the mobile device 100 and the speech to text composition server 250 is a high speed connection. For example, the network connection between the mobile device 100 and the network environment 200, and the connection between the network environment 200 and the speech to text composition server 250 may have a transmission speed of 140 kbit/sec. or above. In some implementations, latency between requesting a speech to text conversion and receiving a converted text is low (e.g., less than 10 seconds or less than 5 seconds).

Figure 3:
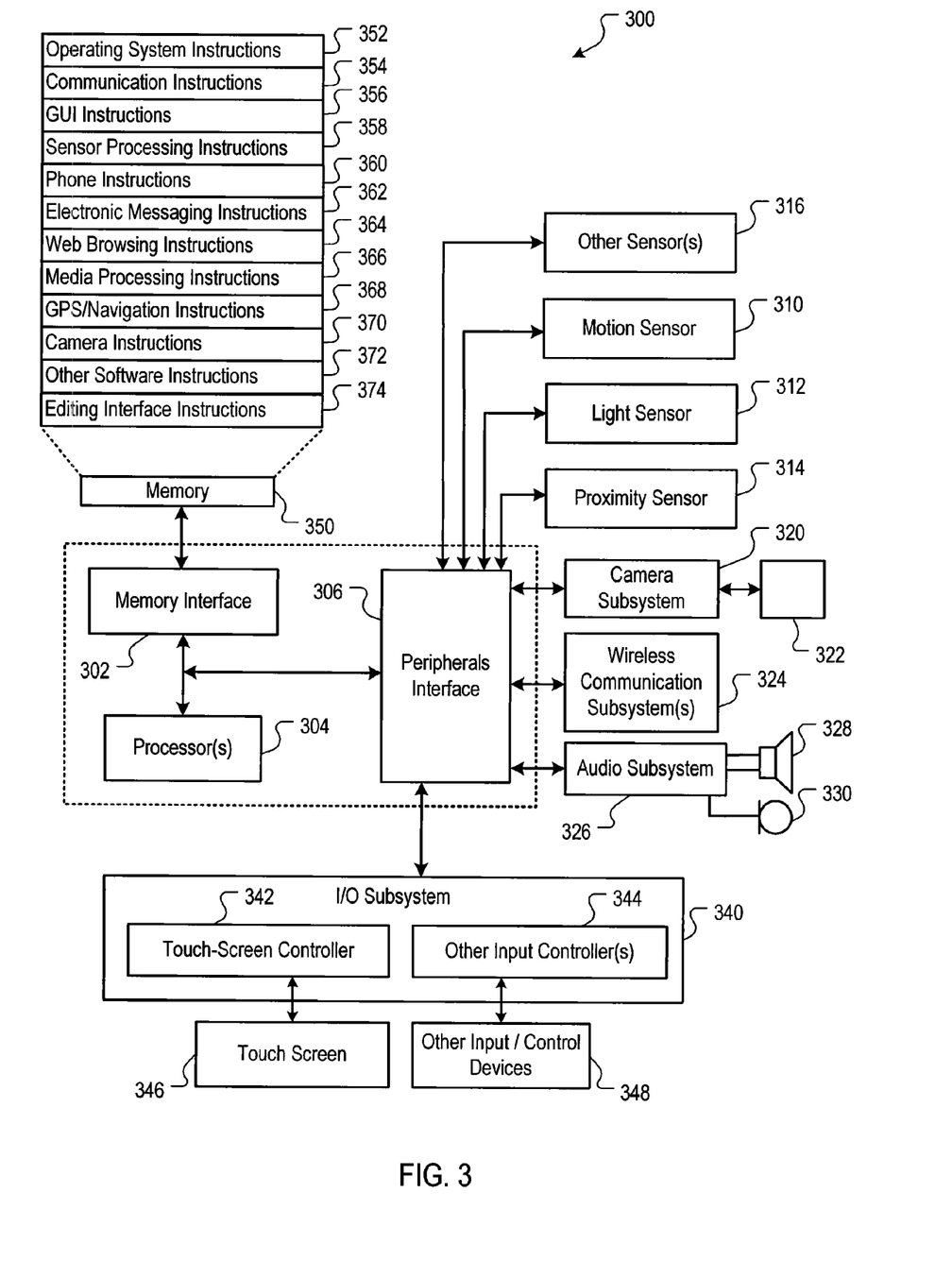
FIG. 3 is a block diagram of an example implementation of the mobile device of FIGS. 1A-1B.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. The mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

In some implementations, the mobile device can also include editing interface instructions 374. The editing interface instructions 374 can be used to receive speech input which is converted to text data as input to another application (e.g., a web browser, e-mail application, instant messaging application, calendar application, etc.). In such implementations, the editing interface instructions 374 can also provide a user with the ability to enter touch data in the form of non-speech data (e.g., punctuation, font format, stylistic effects, etc.) through a virtual keyboard with a modified layout by combining the virtual keyboard entries with the speech data entry based upon a timestamp included with each of the entries. In some implementations, RTP or RTSP can be used to provide a separate speech data stream and a non-speech stream for communication to a server, and the server can operate to combine the speech stream with the non-speech stream and can further operate to provide the combined stream back to the editing interface instructions 374 for display to the user.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4:
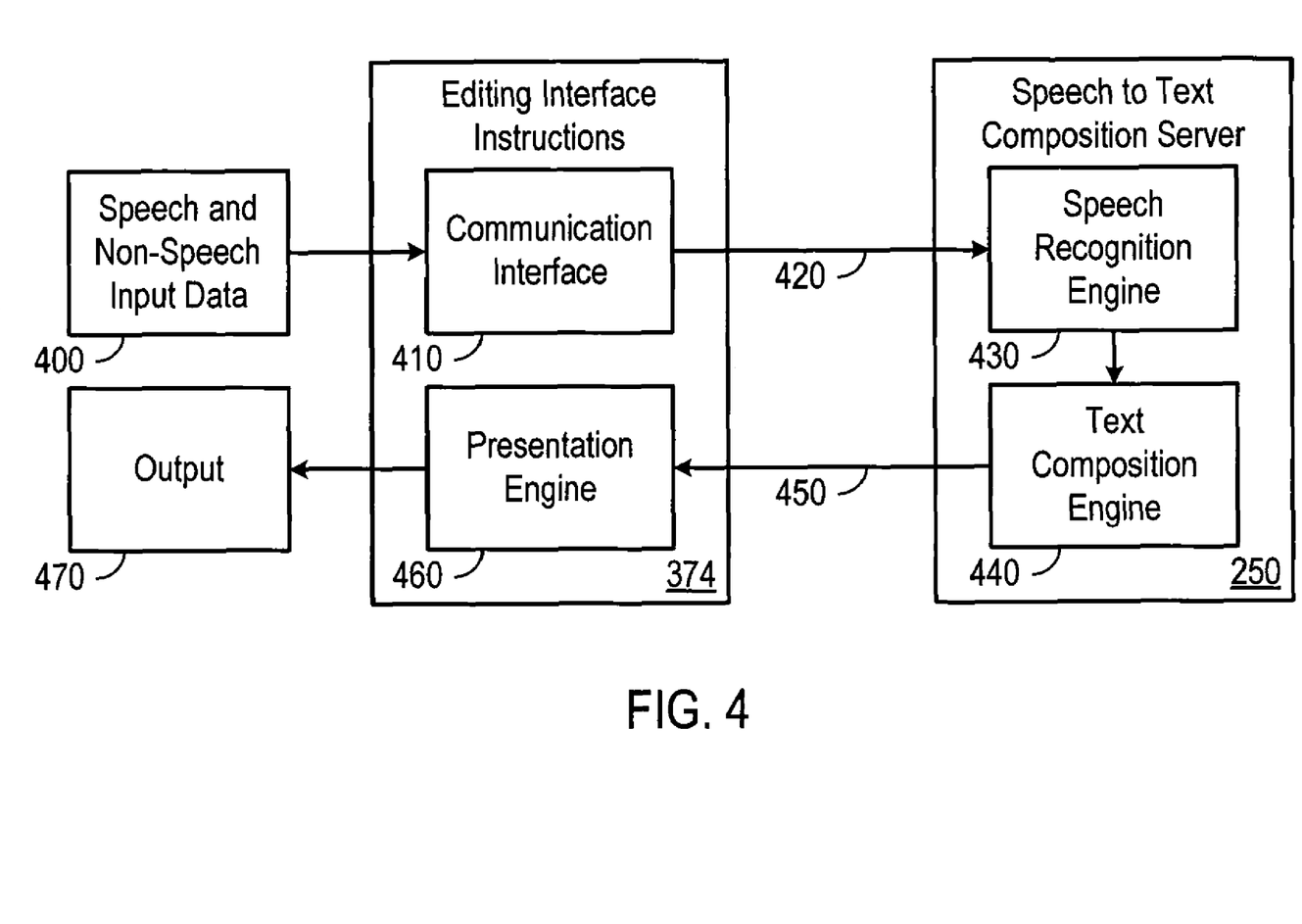
FIG. 4 is a block diagram of example editing interface instructions for communicating with a speech to text composition server.

FIG. 4 is a block diagram of an example system that includes the editing interface instructions 374 and the speech to text composition server 250. In this example, the editing interface instructions 374 can receive speech and non-speech input 400 using a communication interface 410. For example, the communication interface 410 can include an interface to receive speech input from the microphone 160 and an interface to receive non-speech data (e.g., touch data) from the touchscreen of the mobile device 100.

In one implementation, the communication interface 410 is configured to package (e.g., packetize, multiplex) the speech and non-speech (e.g., touch data) into one or more streams transmitted to the speech to text composition server 250. For example, the speech to text composition server 250 may receive two data streams from mobile device 100 using the editing interface instructions 374. One data stream can include speech data, and the other data stream can include non-speech data.

In various implementations, the editing interface instructions 374 are configured to communicate with the speech to text composition server 250 via links 420, 450. For example, the links 420, 450 can be high speed wired or wireless data connections. Using the high speed data connections, latency due to data transmission between the speech to text composition server 250 and the editing interface instructions 374 can be substantially reduced.

In some implementations, the speech to text composition server 250 can include a speech recognition engine 430 and a text composition engine 440 to process a data stream (e.g., including speech data and non-speech data) received from the link 420. The speech to text composition server 250 can convert the received data stream into formatted text data (e.g., data stored in a rich text format). In some implementations, the speech recognition engine 430 can generate time-coded text data or flagged/sequence based text data based on the received data stream. For example, the time-coded text data may include timing information, flagging or sequence data associated with the text data. The speech recognition engine 430 can interpret the timing/sequencing information associated with the received data based on information included in a real-time media protocol. Each of the words, the characters, and/or the non-speech input in the time-coded text data can be associated with a time or sequence. The speech to text composition server 250 can use the associated time or sequence information to synchronize and combine the non-speech input with the speech data.

In some implementations, a text composition engine 440 can be included in the speech to text composition server. A text composition engine 440 can edit the text data derived from the speech data based on the received non-speech input and a set of predefined text composition rules. In one example, the text composition engine 440 can insert punctuations, spaces, and other non-alphanumeric characters in the text data derived from the speech data based on the received non-speech input. In one implementation, the text composition engine 440 can use the associated time, flagging or sequence information associated with the text data derived from the speech data to determine a location for inserting the non-speech input into the text. For example, if the received data stream includes a comma character at time 1.4 seconds, the text composition engine 440 can determine, from the text data, a last character input before 1.4 second and a first character input after 1.4 second. The text composition engine 440 can then insert the comma character between the two determined characters.

Similarly, the text composition engine 440 can apply typeface effects (e.g., bold, italics, underline, carriage return, etc.) based on the associated time in the text data derived from the speech data. For example, the text composition engine 440 can apply a typeface effect to a range of text in the text data derived from the speech data based on the non-speech input enabling and disabling the type face effect. In one example, if the received data stream includes non-speech input to enable a bold effect at time 2.1 seconds and non-speech input to disable the bold effect at 3 seconds, the text composition engine 440 applies a bold effect to the characters in the time text data derived from the speech data between 2.1 seconds and 3 seconds.

In some implementations, the text composition engine 440 can adjust locations of the non-speech input within the text data. In one example, the text composition engine 440 can adjust a location of an inserted non-speech input to correct an incorrect word. For example, suppose the combined text data includes a word "Hell,o." In some examples, the text composition engine 440 detects that the word is not correct. Next, the text composition engine 440, for example, can move the comma character after the character "o" to correct the word "Hell,o" to "Hello." In one implementation, the text composition engine 440 can apply typeface effect based on boundaries of words. For example, the text composition engine 440 can apply typeface effect so that the typeface effect always begins at a beginning of a word and ends at an end of a word.

In some implementations, after the text composition engine inserts the non-speech input, a grammar engine can modify the text with proper punctuation, capitalization, spacing, etc. based on grammar rules. For example, the grammar engine can identify and capitalize the first letters of words that are immediately after a period character, and apply proper spacing after periods. In other examples, the grammar engine can modify the output of the text composition engine 440 such that the text output by the speech to text composition server 250 adheres to identified rules of grammar.

After the text composition engine 440 produces text derived from the speech data and supplemented with the non-speech data, the edited text data can be returned to the editing interface instructions 374 via a link 450. The editing interface instructions 374 can assemble the data for presentation using a presentation engine 460 and output the data to a user interface (e.g., using GUI instructions 356). In some implementations, the presentation engine 460 can generate an output 470 to be displayed. For example, the output 470 can be the text displayed in the input window 130 as shown in FIG. 1B. In some implementations, the presentation engine 460 can also provide user edit functions. For example, the presentation engine 460 can interface with the editing interface instructions to receive user input from the virtual keyboard 140 to edit the output 470.

Figure 5:
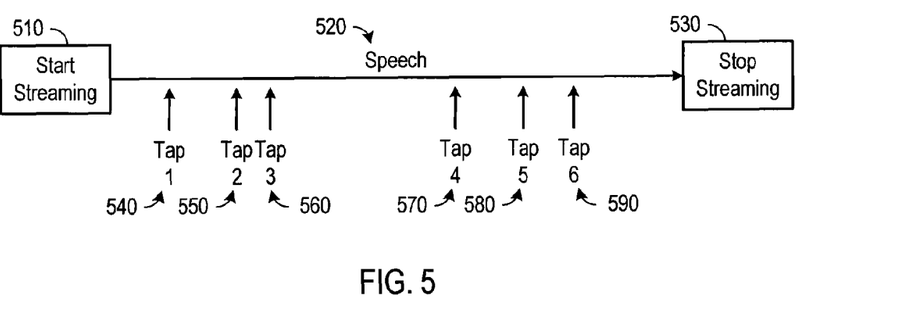
FIG. 5 is a timing diagram illustrating an example timeline in which tap data is received during a voice input session.

FIG. 5 is a timeline 500 showing a speech data stream 520 and non-speech data (e.g., tap data) events 540-590. For example, the speech data stream 520 can be received through a microphone (e.g., microphone 160 of FIG. 1B) after speech input is enabled. For example, the non-speech data 540-590 can be detected using the virtual keyboard 180.

The timeline 500 can include a start streaming node 510 and a stop streaming node 530. The start streaming node 510 can be a time when the user selects to enable speech input. The stop streaming node 530 can be a time when the user selects to disable speech input. The timeline 500 includes a time period for receiving speech 520. The timeline also includes non-speech events 540-590 (e.g., touch data). The non-speech events 540-590 can include events where the user inserts non-speech input by touching or tapping the virtual keyboard 180. In some implementations, the speech data 520 and the non-speech events 540-590 are multiplexed into a data stream based on a time associated with the events 540-590. One example is described in reference to FIG. 6.

Figure 6:
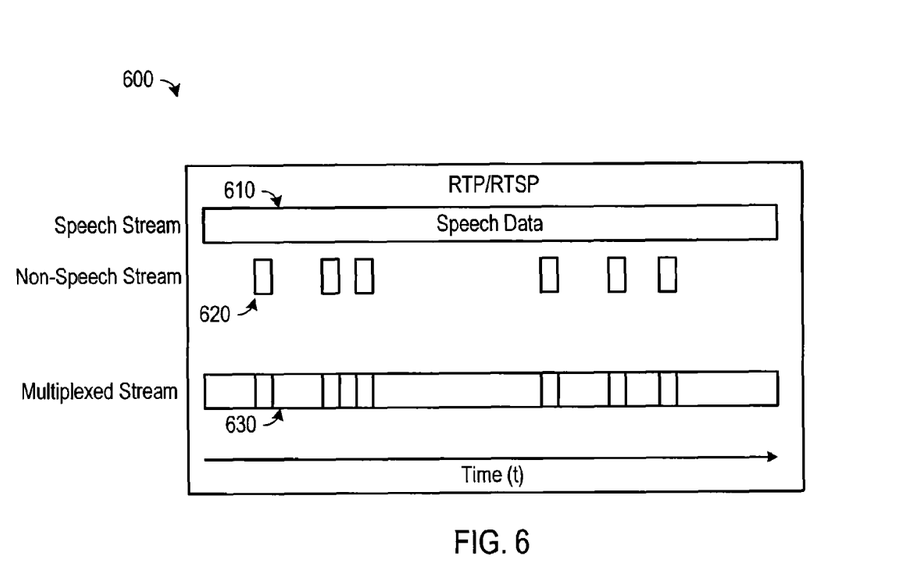
FIG. 6 is a block diagram illustrating an example generation of a multiplexed data stream based on a voice stream and a metadata stream.

FIG. 6 is a block diagram illustrating an example combination of the speech stream 610 and the non-speech stream 620 into a multiplexed stream 630. In the depicted example, the data streams 610, 620 are combined based on RTP or RTSP. Using the RTP or the RTSP, a system, such as the system 300 described in FIG. 3, can provide a synchronized data stream by combining the speech data stream and the non-speech data stream. As shown in FIG. 6, the multiplexed stream 630 is a data stream that includes data from the speech data stream 610 and the non-speech data stream 620. In some implementations, the data streams 610, 620 are combined based on an input time or sequence associated with the data. For example, the mobile device 100 can associate a sequence indicator (e.g., a time stamp) with each of the received data streams with high accuracy (e.g., in the range of microseconds (μs), nanoseconds (ns), or picoseconds (ps)). In one example, the mobile device (e.g., mobile device 100 of FIG. 1B) synchronizes the data streams 610, 620 by comparing the sequence indicators associated with the data in the data streams 610, 620.

In some implementation, there might be delays or timing errors introduced by processing time associated with the ability of the mobile device. In such implementations, the text composition engine can be used to correct for slight delays or timing errors introduced by the mobile device. In further implementations, the mobile device can include noise filtering to provide better input for one or more speech recognition engines used to process the speech input.

In an example, the communication interface (e.g., communication interface 410 of FIG. 4) can receive the speech and non-speech input data 400 having the speech data stream 610 and the non-speech input stream 620. Based on the RTP or the RTSP, the communication interface can multiplex the two data streams 610, 620 into the multiplexed stream 630. For example, the communication interface transmits the multiplexed stream 630 to a server (e.g., server 250 of FIG. 4) including a speech recognition engine (e.g. speech recognition engine 430 of FIG. 4) for further processing. The server can reconstruct the data streams based upon, e.g., sequence information associated with the respective data streams. The server can also combine the text data derived from the speech portion of the data stream with the non-speech data portion of the data stream. The mobile device can filter noise from data during input. The speech recognition engine can also include noise filtering. Moreover, in some implementations, the speech conversion algorithms used to derive the text data from the speech data can be adjusted based upon user feedback.

Figure 7:
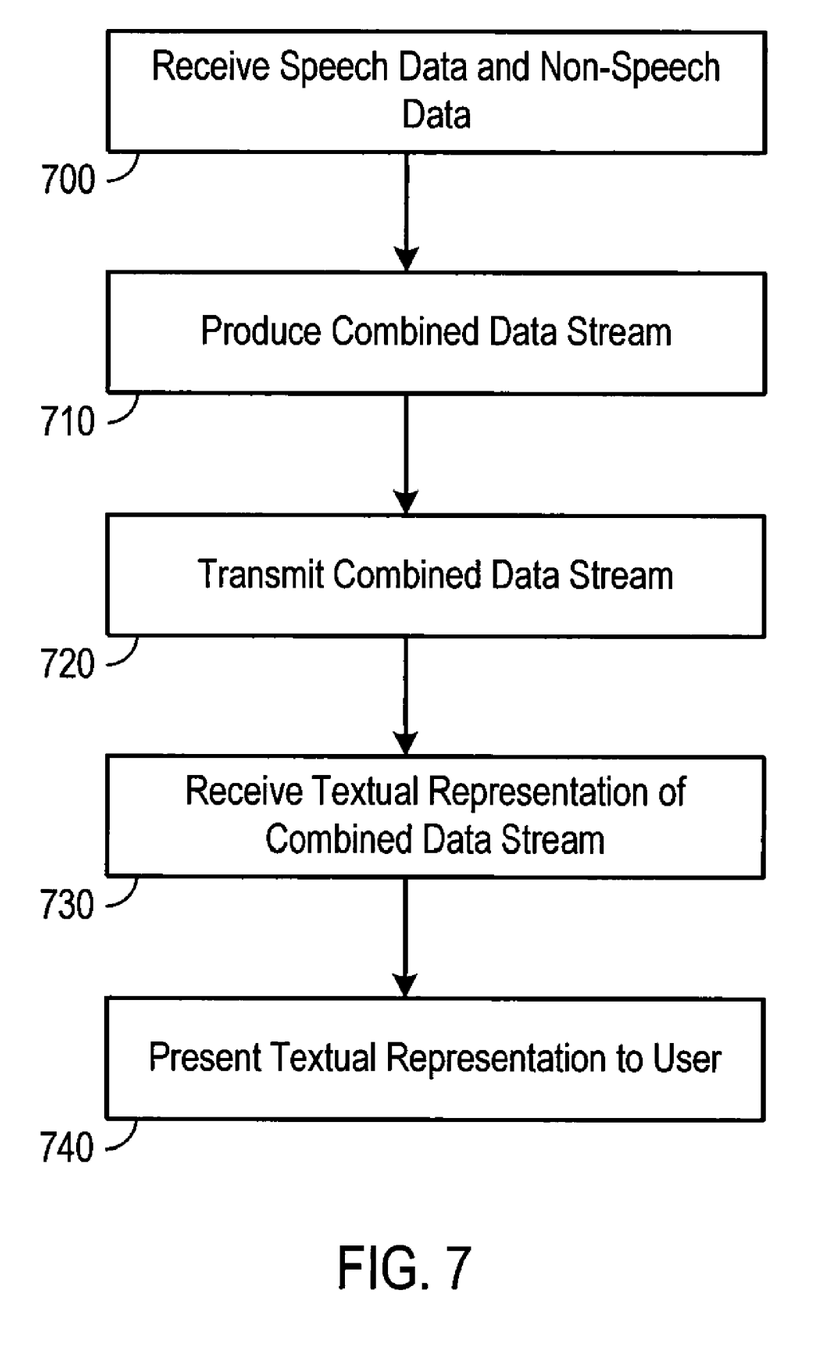
FIG. 7 is a flow diagram illustrating an example method for generating and presenting a textual representation to a user.

FIG. 7 is a flow chart of an example method for generating and presenting a textual representation to a user. For example, the method shown in FIG. 7 can be performed by a processor (e.g., the processor 304 in FIG. 3) that executes the editing interface instructions 374. At stage 700 speech data and non-speech data are received. For example, the speech data and the non-speech data can be received from a microphone (e.g., the microphone 160 of FIGS. 1A-1B) and a touchscreen interface (e.g., the virtual keyboard 180 of FIG. 1B), respectively. In some implementations, the speech data and the non-speech data are associated with their reception time. For example, if a speech data or non-speech data is received at time t, a sequence indicator (e.g., time stamp) representing the time t is associated with the speech data or the non-speech data. In other implementations, the speech data and non-speech data can be associated with a sequence in which they were received. For example, speech segment n could refer to the nth speech segment received while non-speech segment m could refer to the mth non-speech segment received. A text composition engine could insert the first non-speech segment after the first speech segment, or vice-versa, based upon whether speech data or non-speech data is received first.

At stage 710, a combined data stream is produced. For example, a multiplexed stream (e.g., the multiplexed stream 630 of FIG. 6) can be produced by a communication interface (e.g., communication interface 410 of FIG. 4) based on the received speech data and the received non-speech data and sequence information can be associated with the received speech data and non-speech data.

Next, the combined data stream is transmitted at stage 720. For example, the combined data stream can be transmitted by a communication interface (e.g., the communication interface 410 of FIG. 4) to a speech recognition engine (e.g., the speech recognition engine 430 of FIG. 4) using, e.g., RTP or RTSP.

At stage 730, a textual representation of the combined data stream is received. For example, a presentation engine (e.g., the presentation engine 460 of FIG. 4) can receive a textual representation of the combined data stream from a remote speech to text composition server (e.g., the speech to text composition server 250 of FIG. 4). In various examples, the latency between transmitting the combined data stream and receiving the textual representation is low (e.g., less than 3-10 seconds).

The textual representation, at state 740, is presented to the user. For example, a presentation engine (e.g., the presentation engine 460 of FIG. 4) can present the textual representation to the user using a display (e.g., the input window 130). In some implementations, the mobile device can receive edits on the displayed text. For example, a user can use a virtual keyboard (e.g., the virtual keyboard 140 of FIG. 1A) to revised the displayed text. Based on the received edits, the mobile device can correct the displayed text.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
one or more computing devices configured to perform operations comprising:
providing for display a text editor operable to receive speech input and non-speech input;
receiving the speech input;
while receiving the speech input, receiving the non-speech input and time information associated with the non-speech input, the time information operable to specify a sequence in which the speech input and non-speech input are assembled;
retrieving text data from the speech input using speech recognition;
assembling the text data with the non-speech input based on the time information to produce output data and
providing the output data for display in the text editor.

2. The system of claim 1, wherein the time information includes a timestamp of the non-speech input.

3. The system of claim 2, wherein the timestamp indicates a relative time of the non-speech input to the speech input.

4. The system of claim 3, wherein assembling the text data with the non-speech input comprises multiplexing a stream of the speech input and a stream of the non-speech input based on the timestamp.

5. The system of claim 1, wherein retrieving text data from the speech input includes communicating with a speech recognition module located remotely from the computing devices.

6. The system of claim 5, further comprising a communications interface, the communications interface operable to provide a wireless connection to the speech recognition module.

7. The system of claim 6, wherein the communication interface is operable to use a real-time streaming protocol to transmit the speech input and the non-speech input to the speech recognition module.

8. The system of claim 6, wherein the communication interface is operable to multiplex the speech input and the non-speech input into a single communication stream.

9. The system of claim 1, wherein the non-speech input includes a typeface selection operable to change a typeface of the text data.

10. A computer-implemented method comprising:
receiving speech data and non-speech data from a mobile device, the non-speech data being associated with time information, the time information operable to specify a sequence in which the speech data and non-speech data are assembled;
retrieving text data from the speech data using speech recognition;
assembling the text data with the non-speech data based on the time information to produce output data; and
providing the output data to the mobile device.

11. The computer-implemented method of claim 10, further comprising receiving the non-speech data using a wireless connection.

12. The computer-implemented method of claim 11, wherein the non-speech data comprises punctuation, symbols or typeface data.

13. One or more non-transitory computer readable media having software program code operable to perform operations comprising:
receiving speech data and non-speech data from a mobile device, the non-speech data being associated with time information, the time information operable to specify a sequence in which the speech data and non-speech data are assembled;
retrieving text data from the speech data using speech recognition;
assembling the text data with the non-speech data based on the time information to produce output data; and
providing the output data to the mobile device.

14. The computer readable media of claim 13, wherein the time information includes a timestamp of the non-speech data, the timestamp indicating a relative time of the non-speech data to the speech data.

15. A system comprising:
one or more computing devices configured to perform operations comprising:
receive receiving speech data and non-speech data from a mobile device, the non-speech data being associated with time information, the time information operable to specify a sequence in which the speech data and non-speech data are assembled;

retrieving text data from the speech data using speech recognition;

assembling the text data with the non-speech data based on the time information to produce output data; and providing the output data to the mobile device.

16. A computer-implemented method, comprising:

providing for display a text editor operable to receive speech input and non-speech input;

receiving the speech input;

while receiving the speech input, receiving the non-speech input and time information associated with the non-speech input, the time information operable to specify a sequence in which the speech input and non-speech input are assembled;

retrieving text data from the speech input using speech recognition;

assembling the text data with the non-speech input based on the time information to produce output data and providing the output data for display in the text editor.

17. The method of claim 16, wherein the text editor is associated with an application comprising any of an electronic mail application, a web browsing application, a word processing application, a data entry application, a text messaging application, or an instant messaging application.

18. The method of claim 17, wherein the speech input comprises typeface data.

19. The method of claim 16, further comprising multiplexing the speech input and the non-speech input into a single communication stream.

20. The computer-implemented method of claim 16, wherein receiving the speech input includes receiving the speech input using a microphone.

21. The computer-implemented method of claim 16, further comprising:

receiving edit input from a user through a touchscreen interface; and modifying the text data based upon the edit input.

22. The computer-implemented method of claim 16, further comprising transmitting the speech input and non-speech input using a real-time streaming protocol.

23. One or more non-transitory computer readable media having software program code operable to perform operations comprising:

providing for display a text editor operable to receive speech input and non-speech data;

receiving the speech input;

while receiving the speech input, receiving the non-speech input and time information associated with the non-speech input, the time information operable to specify a sequence in which the speech input and non-speech input are assembled;

retrieving text data from the speech input using speech recognition;

assembling the text data with the non-speech input based on the time information to produce output data; and providing the output data for display in the text editor.

24. The computer readable media of claim 23, wherein the speech input and non-speech input include sequence indicators associated with the respective input, the sequence indicators includes a time stamp the inputs.

* * * * *